Figure 1:
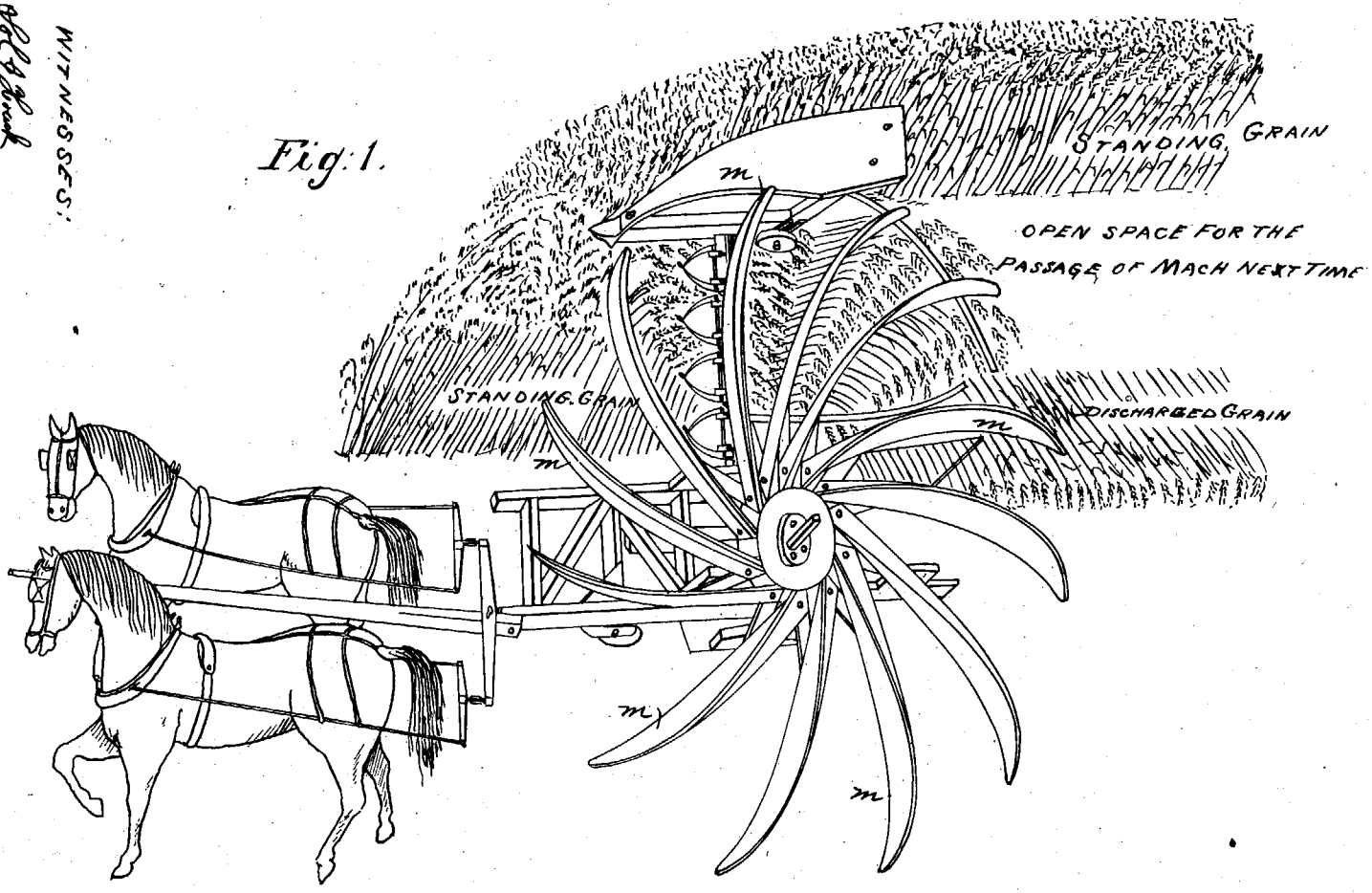

2 Sheets—Sheet 1.

J. L. HARDEMAN.

Hemp and Flax Harvester.

No. 1,077. Reissued Nov. 13, 1860.

WITNESSES:

Sol J. Hirsch
Reuben Miller

N. PETERS, Photo-Lithographer, Washington, D. C.

2 Sheets—Sheet 2.
J. L. HARDEMAN.
Hemp and Flax Harvester.
No. 1,077.
Reissued Nov. 13. 1860.
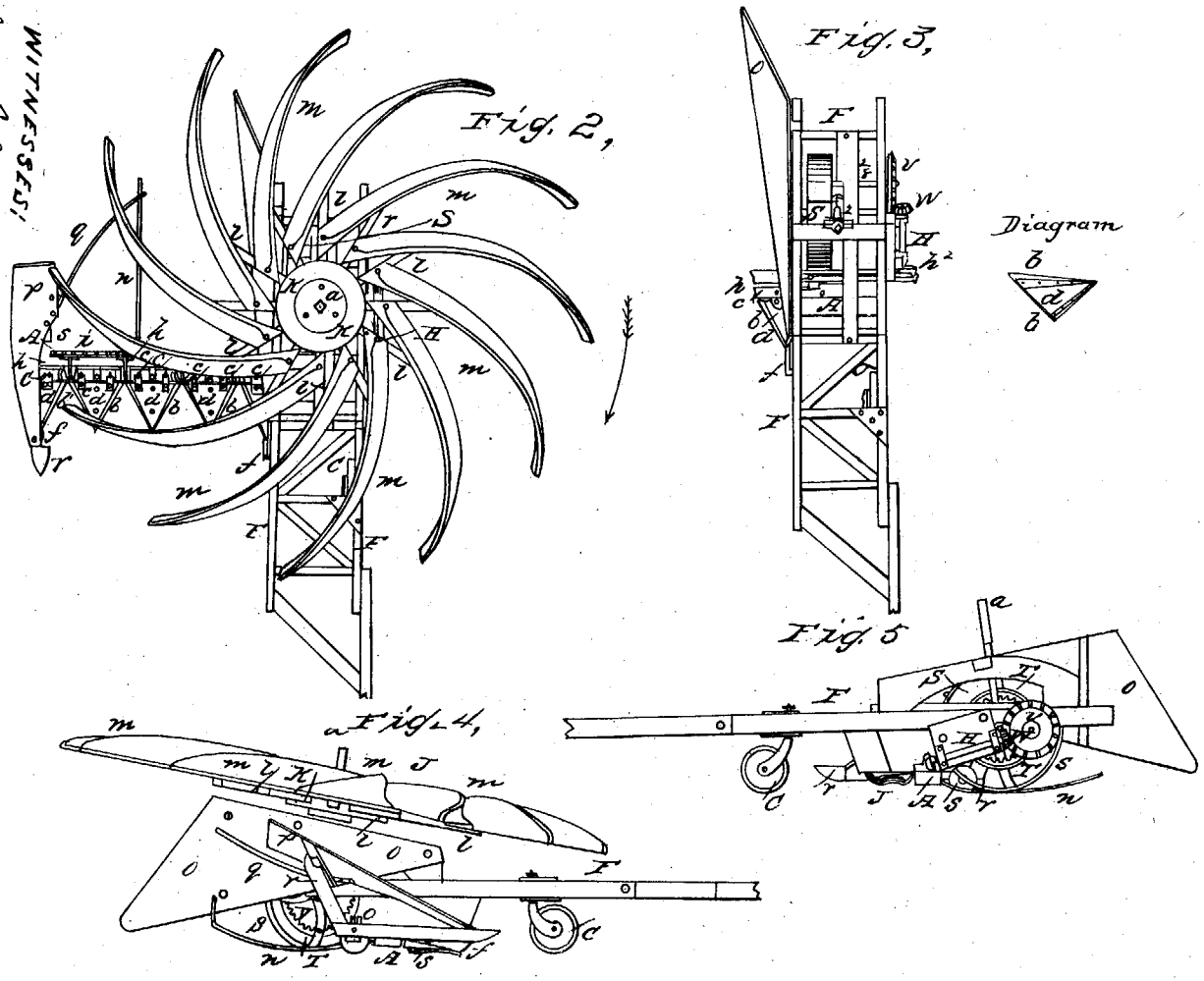
WITNESSES:
Geo. N. Whitely Jr.
Chas. J. Hauck
Richard Miller
N. PETERS, Photo-Lithographer, Washington, D. C.

UNITED STATES PATENT OFFICE.

WM. N. WHITELEY, JR., OF SPRINGFIELD, OHIO, ASSIGNEE OF J. L. HARDEMAN, OF AVON ROCK, MISSOURI.

IMPROVEMENT IN HEMP-CUTTERS.

Specification forming part of Letters Patent No. 13,460 dated August 21, 1855; Reissue No. 1,077, dated November 13, 1860.

*To all whom it may concern:*

Be it known that J. L. HARDEMAN, of Avon Rock, in the county of Saline and State of Missouri, invented a new and useful Improvement in Hemp-Cutters; and I do hereby declare that the following is a full and exact description thereof, reference being had to the accompanying drawings, and the letters of reference marked thereon.

This invention relates to certain improvements in machines for cutting hemp, millet, and other kinds of grasses and grains; and this invention consists in the employment on a harvesting-machine in which the cutting apparatus extends out from one side of the main frame of a reel supported at or near the outer end of the cutting apparatus, and so constructed that its arms or beaters will first press the standing grain against the cutting apparatus and then discharge it in rear of the cutting apparatus and sufficiently to one side to admit of the machine's passing between the grain thus discharged and the standing grain to make the next cut; and this invention also consists in the employment of a guide-rod, in connection with this kind of reel, to assist in the discharge of the cut grain sufficiently off to one side simultaneously with the reeling-down and cutting operation; and this invention further consists in the employment, in connection with the said reel and cutting apparatus, of a divider arranged on the inner end of the cutter-bar, the whole so constructed and combined that the ends of the arms or beaters of the said reel pass round in the open space formed in the grain by the divider and perfectly separate the cut grain from the standing, reeling the former in rear and off to one side of the machine, as will be more fully explained presently.

To enable those skilled in the art to make and use the invention, I will proceed to describe the construction and operation of this improved machine as I have made and used it, referring by letters to the accompanying drawings, forming part of this specification, and in which—

Figure 1 is an isometrical perspective view of one of these improved machines. Fig. 2 is a top view of the same. Fig. 3 is a partial top view of reel detached. Fig. 4 is a side elevation taken from the inner side, and Fig. 5 is a side elevation taken from the other side.

In the different views the same letter indicates the same part of the machine.

A is a straight arm or beam, which passes under and is securely fastened to the main frame F. This beam A extends out from the side of frame F about six feet five inches, at about right angles to the path of motion of the machine.

S is the main ground and driving wheel, which has its axle arranged on the under side of the main frame F, and is so located as to properly balance and support the machine.

C is the caster-wheel; *s*, the tail-wheel. *b* are the scythes; *c*, their hinges. *d* are forms; *d'*, half-forms; *f*, braces or guards; *g*, shears; *h*, shear-bar; *i*, rifle-rod; *j*, reel; *k*, reel-heads, and *l* its arm-supports, and *m* its arms. *n* is a gathering-rod. *o* is a flanking-board. *p* is the separator or divider. *q* is the divider-rod. *r* is the frame-work or braces of the divider.

T is the main driving spur-wheel, which is bolted onto the spokes of the main ground-wheel S. Into this wheel T there meshes a pinion, *t*, on one end of shaft $s^2$. On the other end of shaft $s^2$ there is fastened a bevel-wheel, *v*, which meshes into and drives the bevel-pinion *w* on shaft H, which is the crank-shaft. (See Figs. 3 and 5.) This shaft H, by means of its crank coupled onto the end of pitman *x*, imparts a reciprocating (or vibratory) motion to the shear-bar *h* and rifle-rod *i*. (See Fig. 3.)

The reel *j* is composed of a series of curved arms, *m*, supported by and secured to radially-arranged bars *l*. These bars are permanently arranged in cross-heads or disks *k*, which form the hub of the reel, and which is hung on a nearly-vertical shaft, *a*. (See Figs. 4 and 5.) The shape of the reel and its relative arrangement will be perfectly comprehended by reference to the drawings. The shaft *a* is hung in suitable boxes, 1 and 2, arranged in the main frame of the machine, and is rotated by means of a bevel-gear, *z*, on its lower end, meshing into a bevel-pinion on the shaft or axle of wheel S.

The forms *d* and *d'* are hung, as before mentioned, on the bar A, by means of hinges *e*, whereby they are capable of vibrating freely up and down at their forward end of points.

These hinges are in the form of simple hooks, so that the said forms can be readily removed at pleasure for sharpening, or for the substitution of other forms.

*f* is a curved bar of iron, secured to the under side of the form *d* of scythes *b*. This bar *f* serves as a brace to strengthen the form, and also as a guard (being turned up at the forward end, see Fig. 4) to prevent the ends of forms from running into the ground and cause them to play up and down on their hinges *e* over the inequalities of the ground's surface.

The rifled rod *i*, as seen at Fig. 2, is serrated or corrugated across its top edge, and, as before mentioned, has a reciprocating motion with the shear-bar *h*. The object of this corrugated vibrating end *i* is to shake the butts of the cut and fallen hemp or other material, and thus assist its removal by the reel round to the rear and one side of the machine. The red arrow at Fig. 2 illustrates the direction of motion of the reel *j*.

The scythes *b* are suitably tapered to meet at the point of the forms *d*, (being sharpened,) and are secured to the said forms *d* by screws or bolts. (See illustration marked diagram.) The material not cut by scythes *b* passes back into the shears *g*, which consist of openings in the arm A provided with steel plates, with sharp edges and triangular blades or cutters fastened to and reciprocated in contact with the plates around said openings by the reciprocating bar *h*. The rod *n* is bent down to the ground to trail thereon, and then inclined upward to guide the cut material up out of the stubble while being reeled around, and then up at right angles or vertically, to prevent the cut material from passing off, and to assist in its being carried around to one side of the rear of machine.

At Fig. 1 in the drawings I have illustrated the grain in yellow lines, supposed to be transparent, so as not to obstruct the full view of the machine at work on the grain. From this view will be more clearly comprehended the operation of the reel on the grain in connection with the other parts.

It will be observed and understood that the curved ends of the arms or beaters *m* pass around in the open space formed by the divider *p* in such a manner as not to touch the standing grain along the line Y Y, but so as to gather in all the grain within the divider and which is being cut, the function of the reel being to bring and hold the standing material against the cutting apparatus, and then as it continues its motion to sweep the cut and fallen material around to one side and off at the rear in such manner as to leave the open space (noted in red at Fig. 1) for the passage of the machine the next time between the discharged material and the standing material. The first operation of cutting is effected by the stationary scythes *b*, running into the standing grain, in connectian with the reel to press or hold the top of the material, the said scythes being sloped upward and pointed in a horizontal view, as shown, so as to make a "scythe-cut." The second operation of cutting is effected by the vibrating or reciprocating knives on bar *h*, in connection with the open spaces in bar A, provided with steel plates, and this operation is bestowed on those stalks which escape the scythes *b* without being cut.

I am aware that machines have been constructed previous to this invention with small horizontal reels for track-clearers, &c., and also that reels have been hung without any support at the inner end of the cutter-bar of the machine; and I am aware of reels having been so constructed and hung as to have no support at the inner end of the cutting apparatus, and to operate in such manner as to discharge the cut grain onto a platform or other auxiliary devices, which removed it to one side and in rear of the machine, to admit of the passage of the machine (to make the next cut) between the discharged and standing grain; but I do not consider any of the methods of construction as at all conflicting with the present invention.

Having described the nature and operation of this invention and the mode in which I have practiced the same, what I claim as new, and desire by Letters Patent, is as follows:

1. In combination with a cutting apparatus extending out from the side of the main frame at about right angles to the path of motion of the machine, substantially as described, the employment of the horizontal reel supported entirely outside of or near the stubble end of the cutting apparatus, and so constructed with curved beaters or arms, or their equivalents, that it will press or hold the standing grain against the cutting apparatus, and then sweep the falling and cut material off to the rear of the cutting apparatus and discharge it sufficiently to one side of the machine to admit of the latter passing between the thus-discharged material and the standing material to make the next cut, substantially as described.

2. In combination with the cutting apparatus and reel, the employment of the curved guide-rod *n*, arranged and operating as specified, for the purpose set forth.

3. In combination with the cutting apparatus and the horizontal reel, combined and operating substantially as hereinbefore described, making the end of the curved reel-arms to pass around in the "open space" formed by the divider, as hereinbefore described, for the purposes set forth.

In testimony whereof I have hereunto set my hand this 28th day of September, 1860.

WM. N. WHITELEY, JR.

Witnesses:
REUBEN MILLER,
SOL J. HOUCK.